Patented May 18, 1954

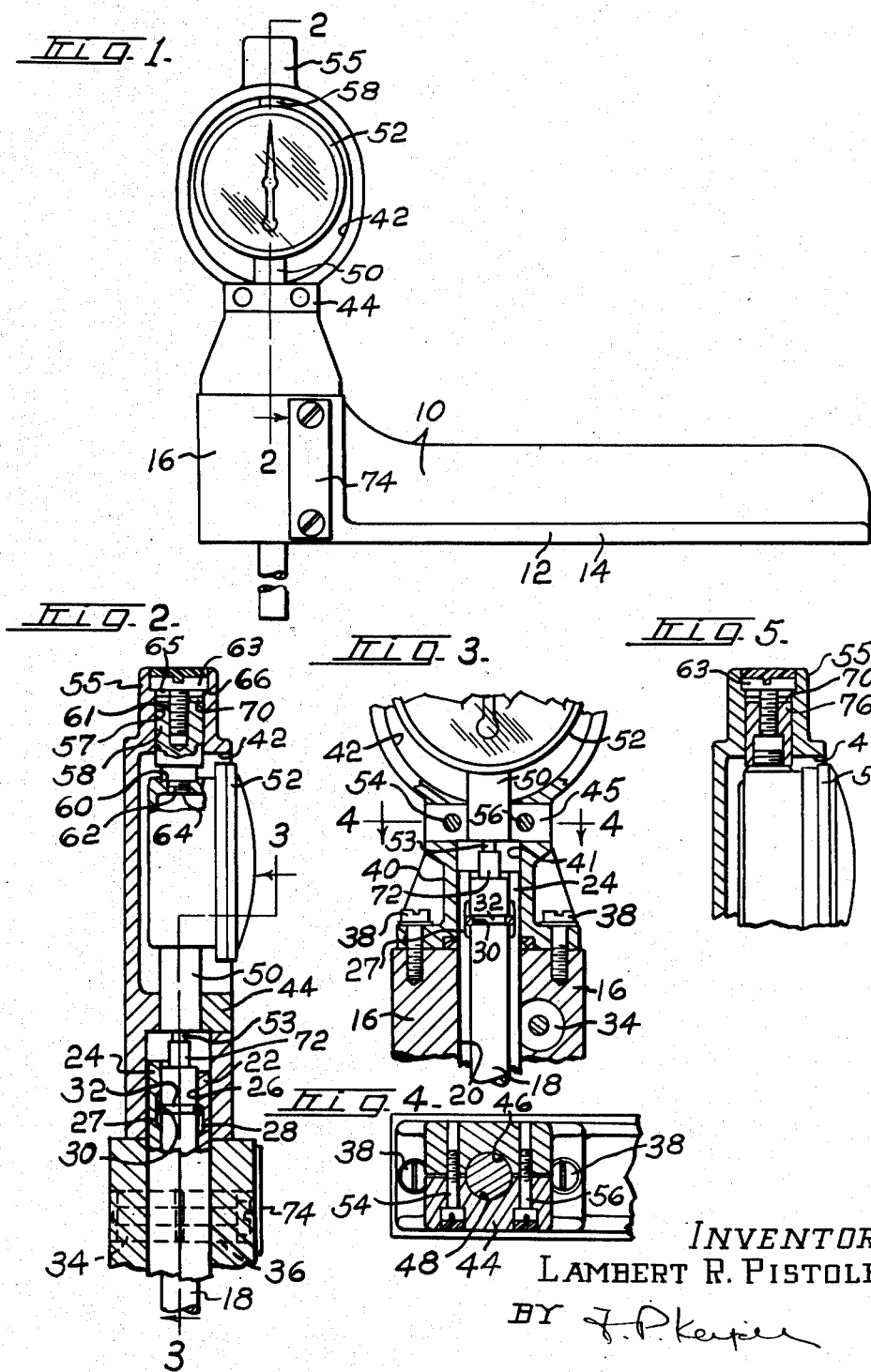

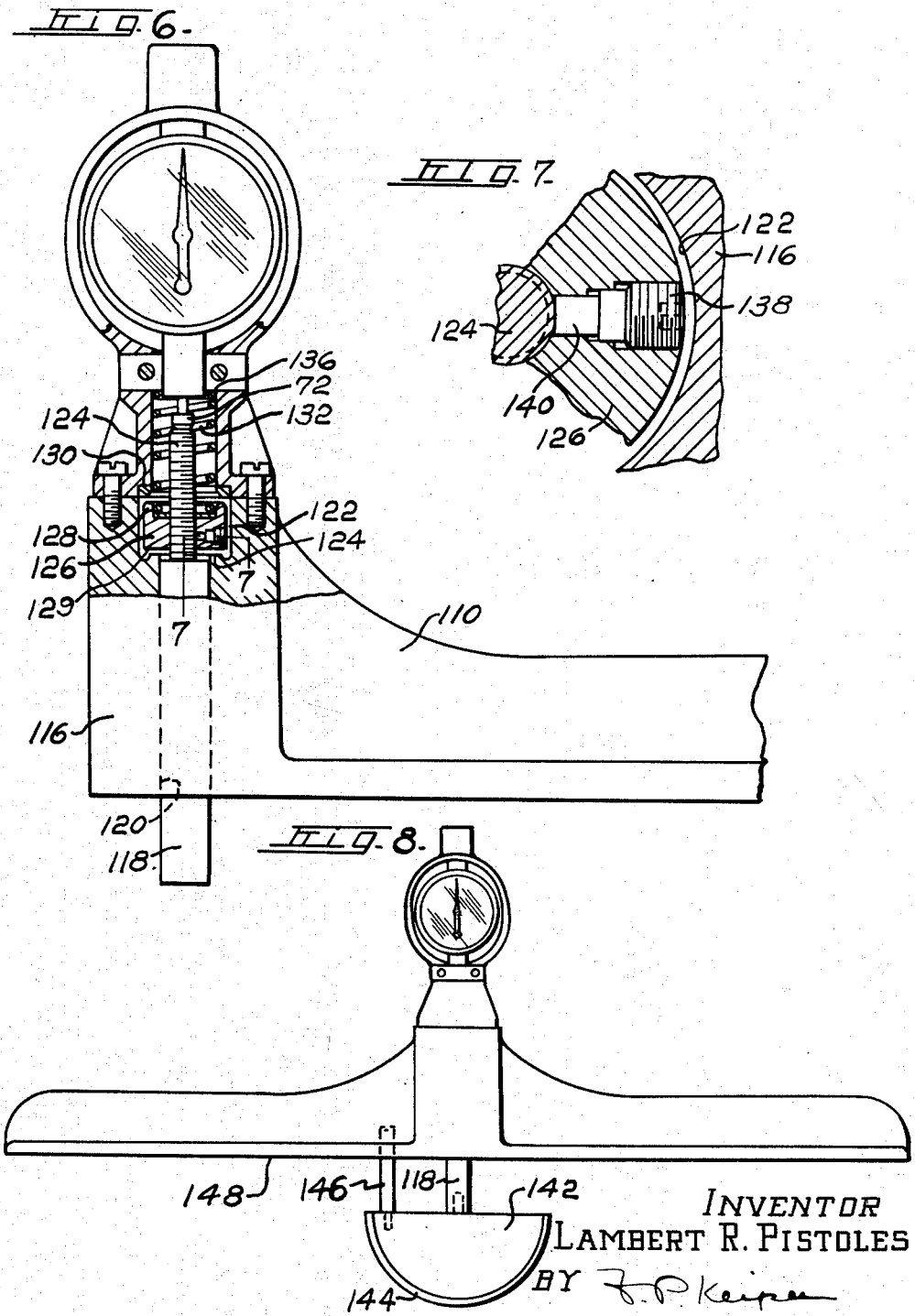

2,678,502

UNITED STATES PATENT OFFICE 2,678,502

GAUGE

Lambert R. Pistoles, Wilmington, Del.

Application November 30, 1948, Serial No. 62,738

9 Claims. (Cl. 33—172)

This invention relates to pin gages, and more particularly to gages operating through a dial indicator.

In copending applications Serial No. 704,347, filed October 19, 1947, and Serial No. 30,069, filed May 29, 1948, now Patent No. 2,597,030, granted May 20, 1952, pin gages of a rugged adjustable character are disclosed, the gaging operation being performed by comparison of flush pin surfaces, although application of a dial indicator is proposed.

It is an object of the present invention to provide a pin gage of a settable character operable through a dial indicator.

It is a further object of the invention to provide a gage of the character described, which shall be rugged and adapted to reliably retain a setting.

A still further object of the invention is to provide a pin gage with dial indicator which may be easily set, economical to manufacture, and of a construction affording maximum protection to the gage.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a front elevation of the pin gage with dial indicator mounted thereon;

Figure 2 is a vertical transverse section taken substantially on the line 2—2 of Figure 1;

Figure 3 is a vertical section taken substantially on the broken line 3—3 of Figure 2;

Figure 4 is a transverse section taken on the line 4—4 of Figure 3;

Figure 5 is an alternative sectional detail;

Figure 6 is a front elevation partly in section of a modified form of the invention;

Figure 7 is an enlarged transverse section taken on the line 7—7 of Figure 6; and Figure 8 is a front elevation of the gage provided with a spherical segment work contact member.

In Figures 1 to 4, inclusive, there is shown a gage comprising a frame 10 having an arm 12 having a plane-gaging surface 14, and a body portion 16 in which there is mounted a gage pin or indicating rod 18, slidable on an axis normal to the plane surface 14. As disclosed in the aforesaid application, the body portion 16 is provided with a bore 20, in which are positioned a pair of half sleeves 22 and 24, in turn providing together a concentric bore 26 for the pin 18. Each of the half sleeves is provided with a semi-annular groove 27 and 28 which coact with a split ring 30 positioned in a groove 32 in the gage pin 18, and are adapted to be clamped in any desired position in the bore 20 by transverse clamp members 34 and 36 wedging against the half sleeves. While any desired clamping arrangement may be employed, reference is made to the copending applications aforesaid, for specific details of preferred forms. The half sleeves may be clamped in opposition, or staggered relation to provide a limited movement of the pin 18, the movement somewhat exceeding the tolerance range in either direction for which the gage is to be set, as will hereinafter more particularly appear.

Rigidly secured to body portion 16 by screws 38 is a gage supporting and housing bracket, having a hollow shank 40 with bore 41, and dial indicator receiving recess 42. The dial indicator receiving recess is somewhat elongated to permit positioning of the indicator in setting the gage as will hereinafter appear. The upper end or throat portion 45 of the shank is provided with split clamping member 44, the bracket and clamping member being provided with semi-cylindrical seats 46 and 48 adapted to fit about and securely clamp the shank 50 of a dial indicator 52. The clamping member 44 is secured to the bracket by clamp screws 54 and 56 arranged in opposite sides and threaded in the bracket. The cylindrical seat 46 is suitably aligned with respect to the bore 20, so as to hold the dial indicator 52 with its indicating spindle 53 in axial alignment with the gage pin 18.

The upper end of the gage frame adjacent the opposite side of the dial indicator recess from the shank, is provided with a boss 55, having a bore 57 therethrough in axial alignment with the gage pin 18. Within such bore is provided a slidable adapter plug 58 having a shoulder 60 and threaded end 62 adapted to be received in the threaded aperture 64 in the wall of the dial indicator. It will be understood that dial indicators are provided with a dust cap or extension member which may be removed to receive the adapter plug 58.

The adapter plug 58 is axially bored and threaded as at 64 to receive a flat head adjusting screw 63, the under face 65 of the head being adapted to bear against shoulder 66 formed in the bore 57.

In practice, it will be seen that gage pin 18 and surrounding half sleeves are so adjusted as to provide a movement of the gage pin over a range exceeding and including the tolerance range for which the gage is to be set. Movement permitted, however, will be less than that which will permit the indicator to move as far as 180° in either direction from zero. The dial indicator frame is then secured to the body portion 16 of the frame, the dial indicator having the desired range inserted in the recess, and thereafter fitted with the adapter plug 58, the latter being screwed securely in place, a screw driver slot 70 being formed in the opposite end to facilitate the operation. A suitable length end point 72 is applied to the indicator spindle. Thereafter, the clamp member 44 is lightly placed in position, and the end adjusting screw 63 inserted in the adapter plug. With the gage pin and surface 14 in contact with surfaces of a standard work piece of the type to be gaged, the dial indicator is moved axially in the recess by manipulating the screw 63 until the indicator hand thereof indicates zero, whereupon the clamp member 44 is drawn tightly around the dial indicator shank by tightening the screws 54 and 56. The gage is thus properly set for gaging operations.

In practice, the heads of screws 54 and 56 and 63 are sufficiently recessed to provide space for a sealing compound such as beeswax, and an indicia strip 74 bearing the gate setting may be applied over the sleeve clamping members 34 and 36. Where the dial indicator is provided with a projecting male thread for reception of a suitable dust cap, the adapter plug will be provided with a suitable complementary female thread, a plug 76 of this type being illustrated in Figure 5.

In the modified form of Figure 6, the gage pin 118 is slidably secured directly in a bore 120, and the body portion 116 of the frame 110 is provided with an axially aligned recess 122 having an annular shoulder 124 at the base thereof. The gage pin 118 is provided with a threaded shank 124 upon which is threaded a collar 126 having an annular shoulder 128 on one end, and a plane face 129 at the other. The dial indicator bracket is the same as that shown in Figures 1 to 4, and is provided with a hardened ring 130 adapted to engage the shoulder 124 of the collar. A light coil biasing spring 132 is positioned within the hollow shank, the same bearing upon the collar 126 and the shoulder 136 formed by the split clamp.

In order to securely hold the collar upon the threaded shank, at any desired setting, a set screw 138, in the form of a socket head screw is threaded radially in the collar, and bears against a brass plug 140, adapted to bear against and be deformed by the preferably hardened thread of the shank 124 of the pin 118.

In practice, collars of varying axial length between the annular shoulder 128 and the face 129, so as to provide for differing axial movement of the pin will be supplied. The movement to be allowed will be sufficient to more than embrace the tolerance range to be indicated, but preferably less than that which would permit rotation of the indicator as much as 180° in either direction from the zero position. Thus, the collar length will in practice be chosen to match the dial indicator characteristics. Also, pins of varying length will be available to provide a complete range, so that the gage may be set for any dimension.

As previously, the dial indicator will be adjusted in its recess, and a proper length end point 72 selected so that the indicator will indicate zero when the gage pin and frame are in engagement with the surfaces to be gaged of a standard work piece.

The gage frame may be of T formation as shown in Figure 8, and the pin fitted with any suitable contacting member such as the segment 142 having a spherical face 144. The segment may be keyed from rotation by a pin 146 adapted to project freely through a suitably located aperture in the face of the gage face 148.

It will be seen that a rugged pin type gage for use with a dial indicator is provided, which may be set in a manner such as to prevent unauthorized tampering, without danger of rough treatment disturbing the setting. Likewise, the dial indicator is afforded complete protection, and is readily held in position where set, or readily removed for use in other situations. With a frame member, and dial indicator bracket, and a set of pins of different lengths and a set of dial indicator end points, a setting for any dimension may be had.

While the invention has been illustrated and described in several forms, it is to be understood that the invention is not limited thereto. As many variations in use and operation and changes in construction and operation may be made without departing from the spirit of the invention, as will be apparent to those skilled in the art, reference will be had to the appended claims for a definition of the limits of the invention.

What is claimed is:

1. In a pin gage, a frame, a gaging surface thereon, a gage pin slidable in said frame normal to said surface, a bracket having a recess for a dial indicator rigidly secured to said frame, means on said bracket for securing a dial indicator with its indicator rod in alignment with said gage pin, means for limiting movement of said gage pin to a range of movement embracing a desired gage dimension and desired tolerances, and a dial indicator held in said bracket by said securing means, and means in axial alignment with the rod and gage pin for moving said dial indicator axially within its holding bracket and with respect to said gage pin with its indicator rod in contacting relation to an end of said gage pin, to secure a zero reading thereof upon the gage pin assuming said desired gage dimension.

2. In a pin gage, a frame, a gaging surface thereon, a gage pin slidable in said frame normal to said surface, a bracket secured rigidly to said frame, said bracket having means to mount a dial indicator with its indicator rod in alignment with said gage pin, a dial indicator mounted on said bracket, and means in axial alignment with the rod and gage pin on said bracket for bodily moving said dial indicator axially relative to said bracket and with respect to said pin.

3. In a pin gage, a frame, a gaging surface thereon, a gage pin slidable in said frame normal to said surface, a bracket secured to said frame, said bracket having means to mount a dial indicator with its indicator rod in alignment with said gage pin, a dial indicator mounted on said bracket, means in axial alignment with the rod and gage pin on said bracket for bodily moving said dial indicator axially with respect to said bracket and pin, and means for rigidly securing said dial indicator against axial movement upon positioning said indicator in a desired indicating position.

4. In a pin gage, a bracket for mounting a dial indicator of the type having a body portion provided with a shank and indicating rod projecting from one side of said body portion, and a threaded securing means oppositely disposed on said body portion aligned with the shank and rod, said bracket having a clamp for the shank of the dial indicator, said bracket also having an axially reciprocal adapter member having complemental securing means axially aligned with said shank clamp and spaced therefrom sufficiently to more than receive the body portion of the dial indicator and adapted to engage the said threaded securing means of said gage, and means for gradually moving said adapter member.

5. In a pin gage, a bracket for mounting a dial indicator, said bracket having an elongated circular recess for receiving and protecting a dial indicator, said bracket having a dial indicator shank clamping means located at one end of said elongated recess, and a bore at the other end of said recess aligned with said clamping means, a shoulder in the outer end of said bore, an adapter for attachment to a dial indicator reciprocal in said bore, and screw threaded means axially threaded in said adapter, and engaging said shoulder, for moving said adapter in said bore.

6. In a pin gage, a frame, a gage pin slidable therein, a recess in said frame coaxial of said pin, a threaded shank on said pin, a collar threaded on said pin located in said recess, a dial indicator bracket having means for securing a dial indicator in alignment with said pin, said bracket partially covering said recess and coacting with an end of said collar to limit movement of said collar and gage pin, and resilient means bearing in an axial direction against said collar for biasing said gage pin away from said bracket.

7. In a dial indicator supporting device, a bracket having formed therein a recess for receiving a dial indicator, substantially aligned bores entering said recess from opposite sides thereof, one of said bores being reduced adjacent the recess and provided with clamping means, an adapter plug slidably positioned in the other bore and means for moving the plug axially of the bore, said recess being elongated in the direction of the axis of said bores to permit movement of a circular dial indicator contained in said recsss in the direction of the axis of said bores.

8. In a pin gage, a frame having a gaging surface thereon, and a gage pin aperture extending normal thereto, a gage pin slidable in said aperture and having a threaded shank within said bore, said bore being enlarged to provide a recess and shoulder, a collar threaded on said shank, transverse means in said collar for locking said collar in a selected position on said shank, and a dial indicator bracket secured to said frame and covering said recess, and having a bore aligned with said aperture and forming an opposed shoulder for said recess, said collar having an axial length less than the axial spacing between said shoulders.

9. In a pin gage, a frame having a gaging surface thereon, and a gage pin aperture extending normal thereto, a gage pin slidable in said aperture and having a threaded shank within said bore, said bore being enlarged to provide a recess and shoulder, a collar threaded on said shank, transverse means in said collar for locking said collar in a selected position on said shank, a dial indicator bracket secured to said frame and covering said recess, and having a bore aligned with said aperture and forming an opposed shoulder for said recess, said collar having an axial length less than the axial spacing between said shoulders, and resilient means in said bore bearing against said collar to bias said pin.

References Cited in the file of this patent

UNITED STATES PATENTS

| Number | Name | Date |
|---|---|---|
| 1,160,630 | MacKinnon | Nov. 16, 1915 |
| 1,290,434 | Walter | Jan. 7, 1919 |
| 1,854,346 | Ostlind | Apr. 19, 1932 |
| 2,052,153 | Willis | Aug. 25, 1936 |
| 2,253,803 | Newberry | Aug. 26, 1941 |
| 2,445,875 | Emery | July 27, 1948 |

FOREIGN PATENTS

| Number | Country | Date |
|---|---|---|
| 339,507 | Germany | Dec. 21, 1919 |